Figure 1:
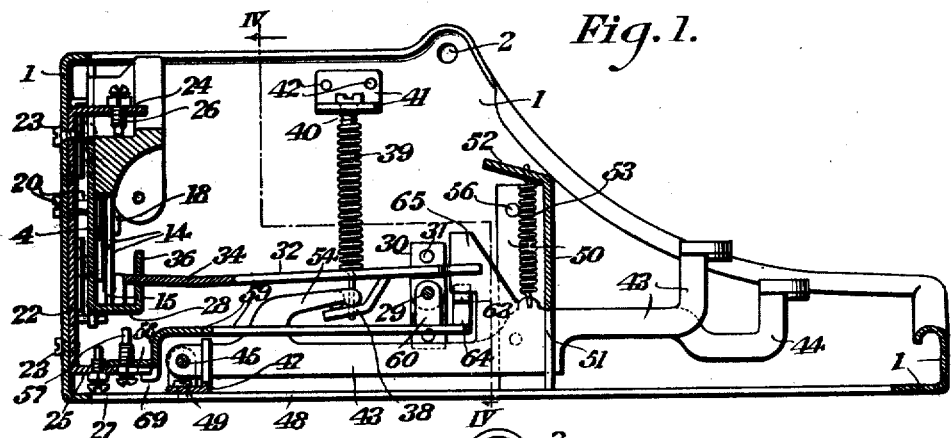

July 17, 1923.

F. H. ARMSTRONG

TYPEWRITING MACHINE

Filed Feb. 21, 1921

1,461,720

4 Sheets-Sheet 1

Inventor
Frank H Armstrong
By
Davis Davis
his Attorneys

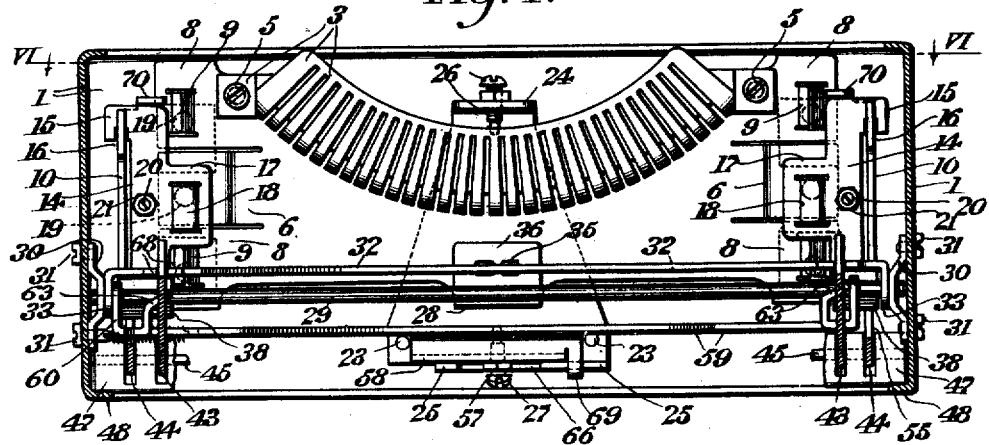

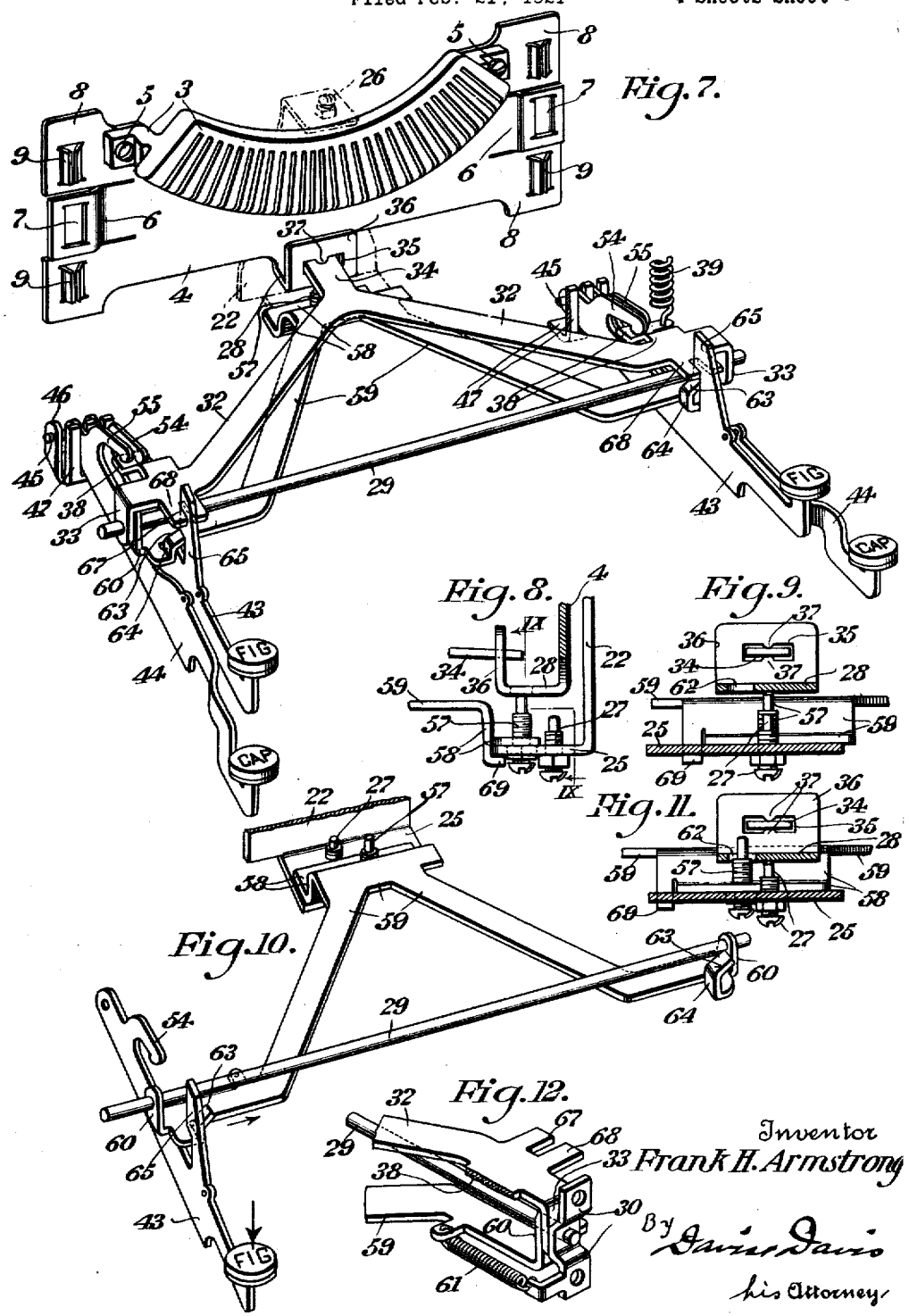

July 17, 1923.
F. H. ARMSTRONG
TYPEWRITING MACHINE
Filed Feb. 21, 1921
1,461,720
4 Sheets-Sheet 4
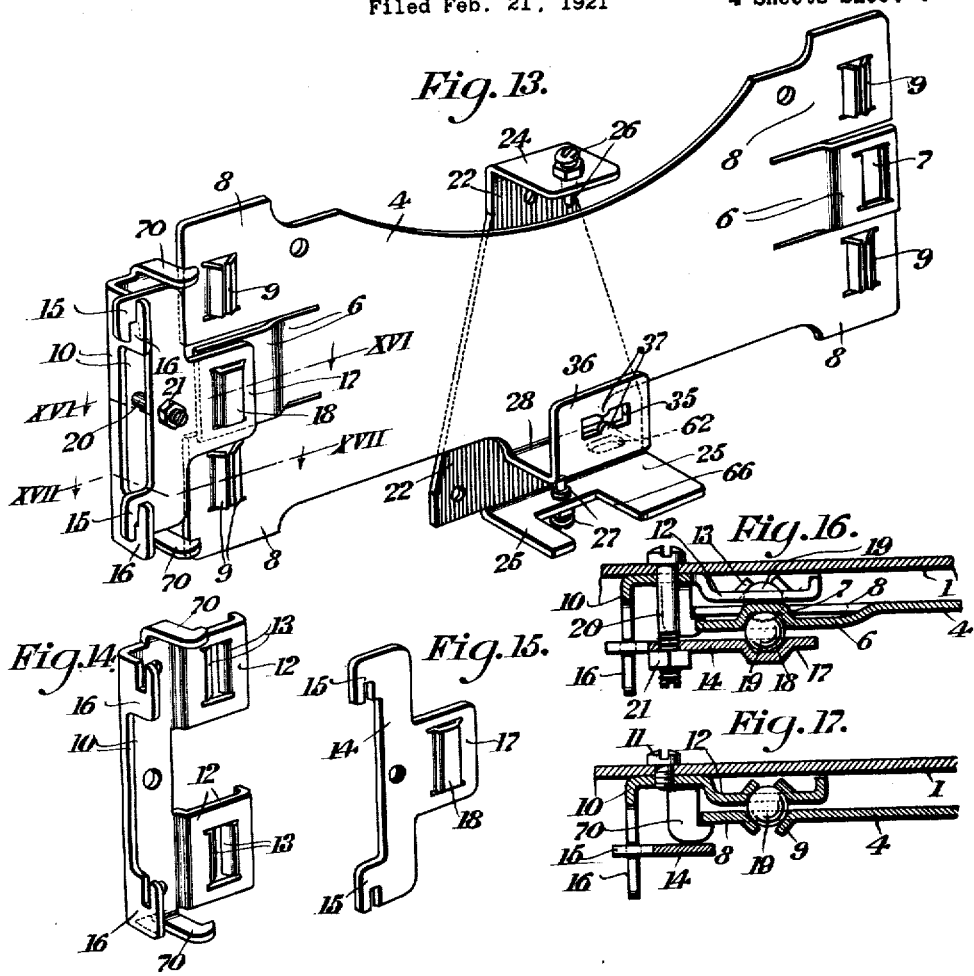
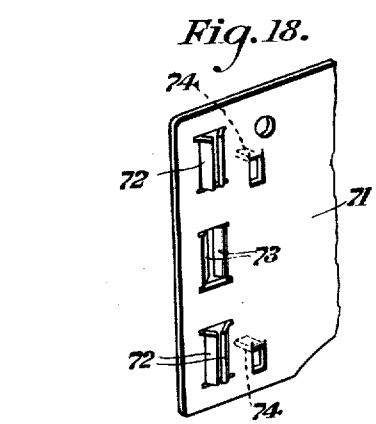
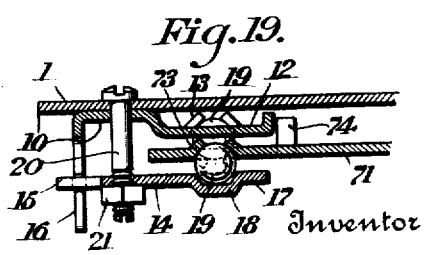
Inventor
Frank H. Armstrong
By
his Attorneys Patented July 17, 1923.

1,461,720

UNITED STATES PATENT OFFICE.

FRANK H. ARMSTRONG, OF AUBURN, NEW YORK, ASSIGNOR TO CORONA TYPEWRITER COMPANY, INC., OF GROTON, NEW YORK, A CORPORATION OF NEW YORK.

TYPEWRITING MACHINE.

Application filed February 21, 1921. Serial No. 446,525.

*To all whom it may concern:*

Be it known that I, FRANK H. ARMSTRONG, a citizen of the United States, and resident of Auburn, in the county of Cayuga and State of New York, have invented certain new and useful Improvements in Typewriting Machines, of which the following is a specification.

This invention relates to improvements in typewriting machines, and has for its object to provide an improved case shift mechanism for such machines.

Figure 2:
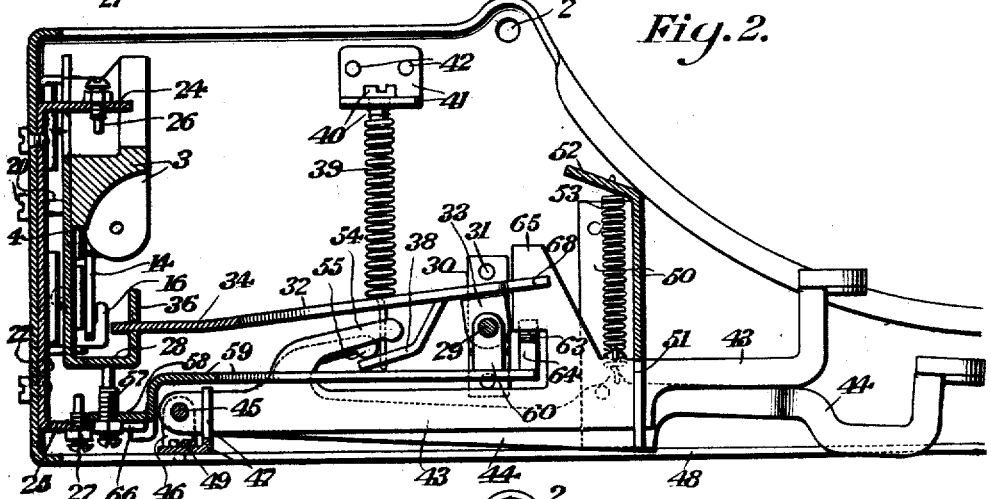
Figure 3:
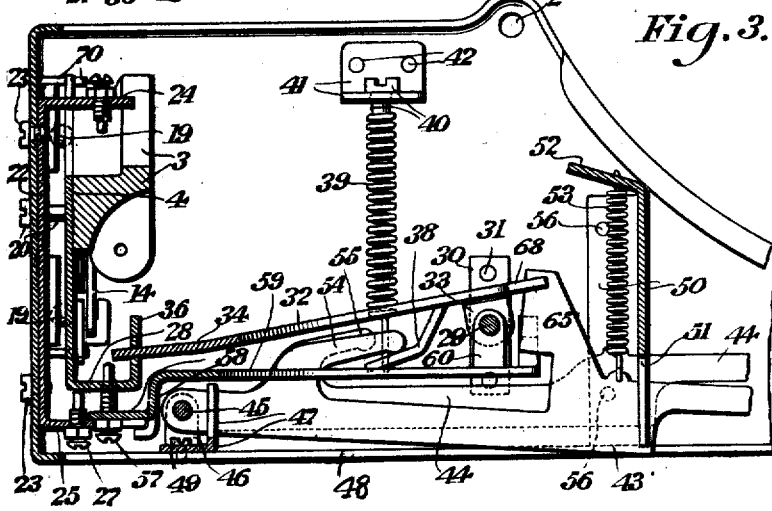

In the drawings:

Fig. 1 is a central longitudinal sectional view showing the case shift mechanism in normal position, those parts of the machine not necessary to show the construction and operation of the case shift mechanism being omitted;

Fig. 2 a view similar to Fig. 1, showing the parts in Cap. shift position;

Fig. 3 a view similar to Fig. 1, showing the parts in Fig. shift position;

Fig. 4 a vertical transverse section on the line IV—IV of Fig. 1;

Fig. 5 a view similar to Fig. 4, showing the parts in Fig. shift position, the frame and the ball bearings for the segment carrier being omitted;

Fig. 6 a horizontal section on the line VI—VI of Fig. 4;

Fig. 7 a fragmentary perspective view of the case shift mechanism;

Fig. 8 a detail view showing the segment carrier arrested by the Cap. shift stop;

Fig. 9 a section on the line IX—IX of Fig. 8;

Fig. 10 a detail perspective view showing the Cap. shift stop carrier shifted to inactive position by the left hand Fig. shift key;

Fig. 11 a view similar to Fig. 9 showing the parts in Fig. shift position;

Fig. 12 a detail view showing the means for supporting the forward ends of the stop carrier and the lever which shifts the segment carrier;

Fig. 13 a perspective view of the segment carrier and the bracket upon which the lower case and Fig. shift stops are mounted;

Figs. 14 and 15 detail perspective views of parts of the guiding means for the segment carrier;

Fig. 16 a section on the line XVI—XVI of Fig. 13;

Fig. 17 a section on the line XVII—XVII of Fig. 13; and

Figs. 18 and 19 detail views of a modified form of segment carrier and guiding means therefor.

I have shown the invention embodied in a small portable typewriting machine of the front strike type having a pressed steel main frame 1 to which a platen carriage support is adapted to be pivotally connected at 2 to permit the platen and carriage to be folded forwardly out of cooperative relation with the type bars to a compact position over the keyboard. It will be obvious, however, that the invention is not limited in its application to machines of this type, and it will also be understood that the invention may be embodied in a mechanism for shifting a platen instead of a type-bar segment.

The type-bars (not shown) are pivotally mounted in the segment 3 in the usual manner. The type-bar segment is secured to the shiftable support or carrier 4 by screws 5 which may also serve to secure a type-bar rest to the carrier, as shown in my copending application Serial No. 444,448, filed February 12, 1921. The segment carrier 4 comprises a flat sheet metal plate sufficiently thin to temporarily spring or flex under pressure. The carrier extends transversely of the machine and is shiftable edgewise in a vertical plane.

Both end portions of the carrier are slit along two horizontal lines to divide the same into three resilient portions or tongues. The central tongues 6 are slotted adjacent their free ends along two horizontal lines and the metal between said slots is pressed rearwardly to form a vertically extending ball channel or race 7 in each tongue 6 facing toward the front of the machine. Tongues 6 are preferably offset slightly in front of the plane of the body portion of the plate to avoid possible interference of the rearwardly pressed channels 7 with parts of the carrier guiding means hereinafter described. The two upper and lower tongues 8 at each end of the carrier are each slotted along two horizontal lines and the metal between said slots is split along a vertical line and pressed forwardly to form a vertically extending ball channel or race 9 in each tongue 8, said channels 9 facing rearwardly.

A pair of sheet metal brackets 10 are rigidly held to the rear wall of the main frame 1 by screws 11 at points adjacent the ends of the segment carrier. Each bracket 10 is formed with a pair of vertically spaced resilient portions or tongues 12 offset from the rear wall of the frame and located at the rear of the adjacent tongues 8 on the carrier. Each tongue 12 is provided with a vertically extending and forwardly facing ball channel or race 13 cooperating with the channel 9 in the adjacent tongue 8 on the carrier. Channels 13 are formed in the same manner as channels 9. The free end of each tongue 12 is provided with a rearwardly extending flange adapted to prevent excessive rearward flexing of the tongue which might result in crushing the rearwardly pressed parts of the tongue against the back wall of the machine.

An adjustable plate-like sheet metal member 14 is held to each bracket 10, each member 14 having two slotted ears 15 loosely interlocked with two forwardly extending slotted ears 16 on the bracket to form a separably interlocked loose connection, as more clearly shown in Figs. 13 to 17. Each plate-like member 14 is provided with a resilient portion or tongue 17 extending inwardly in front of the adjacent tongue 6 on the segment carrier and provided with a vertically extending and rearwardly facing ball channel or race 18 cooperating with the channel 7 in tongue 6. Channels 18 are formed in the same manner as channels 7. The six pairs of cooperating channels above described form six independent raceways, two of which are located at the front of the carrier 4 and four of which are located at the rear of the carrier. An antifriction ball 19 is confined in each raceway. It will be obvious that the ball channels may be formed in the tongues in various other ways than those described, or that channel-forming means may be attached to the tongues.

The members 14 are adjustable fore and aft of the machine by means of adjusting bolts 20 having lock nuts 21 threaded thereon. Bolts 20 extend forwardly through the rear wall of frame 1, and brackets 10 and are threaded through members 14. After the balls 19 are placed in the raceways the adjusting bolts are rotated to pull the members 14 rearwardly until all of the channeled tongues are placed under tension, thus causing the series of spring tongues to bear against all the balls 19 with a yielding or spring pressure. Lock nuts 21 are then tightened. It will be obvious that the foregoing construction provides means whereby wear in any or all the raceways will be automatically taken up, that the raceway channel carrying members will flex or yield to compensate for inequalities in manufacture of the sheet metal parts and to permit the balls to pass obstructions caused by foreign matter collecting in the raceways, that the means forming each individual ball race is independently yieldable, and that the antifriction guiding means for the segment carrier is so constructed as to absorb violent shocks to which the machine may be subjected.

A sheet metal bracket 22 is secured to the rear wall of the main frame 1 by screws 23 and is provided at its upper and lower ends with integral forwardly extending shelf portions 24 and 25. An adjustable stop screw 26 is threaded downwardly through shelf 24 and is adapted to be engaged by the upper edge of segment 3 to limit the upward movement of the segment carrier 4 and thus determine the normal or lower case position of the segment. An adjustable stop screw 27 is threaded upwardly through shelf 25 and is adapted to be engaged by an integral forwardly extending foot or abutment 28 formed on the lower edge of the segment carrier to determine the lowermost or Fig. shift position of the segment 3.

A rod 29 extends transversely of the main frame at a point forward of the segment carrier and is supported at its ends in brackets 30 secured to the side walls of the frame by screws 31. A three-arm Y-shaped lever is fulcrumed on rod 29, the forwardly and laterally extending arms 32 thereof being provided with downwardly turned pivot ears 33 abutting against brackets 30 to prevent sidewise movement of the lever. Rod 29 extends through apertures in pivot ears 33. The other arm 34 of the Y-shaped lever extends rearwardly centrally of the machine and the rear end thereof extends through a slot 35 in an upstanding flange 36 formed at the forward edge of foot 28, thus forming a separable pivotal or rocking connection between the Y-shaped lever and the segment carrier. Bosses 37 are preferably provided at the upper and lower edges of slot 35, these bosses engaging the upper and lower faces of lever arm 34. Arms 32 of the Y-shaped lever are provided with rearwardly extending lugs 38 adjacent their forward ends, and the lower end of a coil spring 39 is connected with one of said lugs. The spring 39 normally holds the segment carrier in its uppermost position. A tension adjusting screw 40 is threaded into the upper end of the spring, said screw passing through a bracket 41 secured to the adjacent side wall of the machine by screws 42. It will be obvious that a second lifting spring 39 may be connected to the other lug 38 if desired.

Two Fig. shift key levers 43 are provided at opposite sides of the frame, and two Cap. shift key levers 44 are provided at opposite sides of the frame adjacent the two Fig. shift levers. All four shift key levers are fulcrumed at their rear ends on a rod 45 supported in lugs 46 formed on an angular rear key lever guide comb 47. The comb 47 has its base flange or web secured to flanges 48 on the side walls of the frame 1 by means of screws 49. The upstanding flange or web of comb 47 is provided with the usual vertical guide slots for the shift key levers and for the printing key levers (not shown). A forward guide comb 50 is provided with guide slots 51 for the shift levers and printing key levers and is also provided at its upper edge with a rearwardly extending flange 52. Return springs 53 are connected to the shift key levers and flange 52. Comb 50 is provided with end flanges secured to the side walls of frame 1 by suitable screws 56.

Each Fig. shift lever 43 is provided with an upwardly and forwardly extending tappet or arm 54 engaging over the adjacent lug 38 on the Y-shaped lever, and each Cap. shift lever 44 is provided with an upwardly and forwardly extending tappet or arm 55 engaging over the adjacent lug 38 on said Y-shaped lever. Tappets 54 are longer than tappets 55 so that the Fig. shift levers may shift the segment to its lowermost position by a movement thereof to the same extent as that imparted to the Cap. shift levers in shifting the segment to its intermediate position. It will be obvious that the depression of the key on either shift lever will rock the Y-shaped lever downward, and thereby pull the segment carrier downward against the tension of spring 39.

For arresting the segment and its shiftable support 4 in intermediate or Cap. shift position, I provide a Cap. shift stop-screw 57 threaded upwardly through a shoe 58 formed at the junction of the rear ends of the two diverging arms of a V-shaped stop-carrier 59. The stop-carrier 59 is slidably supported at its forward end on rod 29, the forward ends of the diverging arms of the carrier being provided with upstanding lugs 60 having apertures therein through which the rod extends. A tension spring 61 connected to the left hand arm of the stop carrier and to the adjacent bracket 30 normally pulls the stop carrier toward the left, holding lug 60 on the left hand arm against the adjacent pivot lug 33 of the Y-shaped lever. In this position of the stop carrier 59 the Cap. shift stop is directly under a solid portion of foot 25 on the segment carrier, and as there is no connection between either of the Cap. shift levers 44 and the stop carrier the segment-carrier 4 will be arrested by stop 57 when either key lever 44 is actuated.

The foot 25 has an aperture 62 therein normally out of register with stop screw 57, and each Fig. shift lever 43 has a direct cam connection with stop carrier 59 for sliding the stop carrier toward the right when either of the key levers 43 is actuated to move stop 57 into register with the aperture 62. Each diverging arm of the stop carrier is provided with an integral upstanding lug or cam having an inclined cam surface 63 and a vertical dwell surface 64. Each Fig. shift lever 43 is provided with an upwardly and rearwardly extending finger or hook 65 the lower edge of which normally engages the high point of the cam surface 63 on the adjacent arm of the stop carrier. When either Fig. shift key is depressed hook 65 on the key lever will ride down the cam surface 63 therebeneath and shift the carrier to the right far enough to place stop 67 in register with aperture 62 before foot 28 engages said stop, the hook passing the dwell portion 64 of the cam lug during the final part of the downward movement of the shift key and stop 57 passing through aperture 62 as foot 28 moves downward into engagement with the Fig. shift stop 27. Shelf 25 is cut away at 66 to provide clearance for the lower end of shiftable stop screw 57, and each stop screw preferably has a lock nut threaded thereon, as shown.

The upper ends of hooks 65 are preferably guided in slots 67 formed in forwardly projecting lugs 68 on the stop carrier, thus ensuring proper alignment of the hooks relatively to the cams on the stop carrier. The shoe 58 on the stop carrier is provided with a lug or hook portion 69 engaging under the forward edge of shelf 25 to prevent movement of the shoe vertically relatively to the shelf in handling the machine. Brackets 10 are preferably provided with hook lugs 70 at their upper and lower ends spaced slightly from the side edges and front faces of tongues 8 on the segment carrier and serving to prevent excessive lateral and forward movements of the carrier when the machine is tilted or subjected to shocks.

In Figs. 18 and 19 a slightly modified form of segment carrier and antifriction bearing is shown. The segment carrier 71 comprises a thin springy or resilient sheet metal plate provided at its upper and lower corners with rearwardly facing ball channels 72 cooperating with the channels 13 in tongues 12 on brackets 10. The carrier 71 is provided at each end with a central forwardly facing ball channel 73 cooperating with channel 18 in the tongue 17 on the adjacent adjustable member 14. Carrier 71 is provided with rearwardly extending lugs 74 normally spaced from the inner edges of tongues 12 on the brackets 10 and serving to prevent undue sidewise movement of the carrier, the lugs 70 being omitted from brackets 10 in this construction. In this modified form the end portions of the carrier are adapted to spring or flex bodily.

What I claim is:

1. In a typewriting machine, the combination of a support having a plurality of resilient portions adjacent both ends thereof, a type-bar segment on the support, a plurality of guides at each end of the support, each of said resilient portions of the support cooperating with a different guide, and key-operated means for shifting the support.

2. In a typewriting machine, the combination of a plate-like sheet metal support shiftable vertically edgewise to change case and provided with a plurality of resilient portions, key-operated means for shifting said support, and guiding means for the support, certain of said resilient portions cooperating with the guiding means to resist movement of the support forwardly and the others to resist movement of the support rearwardly.

3. In a typewriting machine, the combination of a support shiftable different distances in one direction from a normal position to change case, a slidably mounted stop cooperating with said support to arrest the support at a point intermediate its normal position and maximum shifted position, a pair of shift keys operatively connected to shift the support, a spring holding said stop in support-arresting position, and cam means operable by only one of said keys for sliding the stop transversely of the machine out of support-arresting position.

4. In a typewriting machine, the combination of a support shiftable to change case, a pair of shift key levers connected with the support for shifting the support vertically in the same direction to different positions, a shiftable stop for arresting the support, a carrier for the shiftable stop slidably supported in the frame to move transversely of the machine, a stationary stop for arresting the support at a point farther from its normal position than that determined by the shiftable stop, and a spring connected with the carrier for normally holding the shiftable stop in support-arresting position, said carrier being provided with a cam surface in the path of movement of one of the shift-key levers for sliding the carrier transversely of the machine to move the shiftable stop out of support-arresting position.

5. In a typewriting machine, the combination of a support shiftable to change case, a pair of independently operable shift key levers, means operable by the levers for shifting the support vertically in the same direction to different positions, a shiftable stop for arresting the support, a stationary stop for arresting the support at a point farther from its normal position than that determined by the shiftable stop, a carrier for the shiftable stop slidably mounted to move transversely of the machine, means forming a direct cam connection between the carrier and one of the shift key levers for sliding the carrier transversely to move the shiftable stop out of support-arresting position when the key-carrying end of said lever is depressed, and a restoring spring connected with the carrier.

6. Double case shift mechanism for typewriting machines comprising a support shiftable to change case and carrying an apertured abutment, a slidably supported intermediate case stop adapted to be engaged by said abutment, a pair of shift keys operatively connected to shift the support to two different positions, and means operable by one only of said keys for sliding the intermediate case stop into register with the aperture in said abutment.

7. Double case shift mechanism for typewriting machines comprising a support shiftable to change case and carrying an apertured abutment, a slidably supported intermediate case stop adapted to be engaged by said abutment, a pair of shift keys operatively connected to shift the support to two different positions, means operable by one only of the shift keys for sliding the stop into register with the aperture in said abutment, and a spring normally tending to shift the stop out of register with said aperture.

8. In a typewriting machine, the combination of a type bar segment, an abutment movable with said segment having an aperture thereon, a pair of relatively shiftable stepped stops adapted to be engaged by said abutment to arrest the segment, a pair of shift keys operatively connected to shift the segment, and means operable by only one of the shift keys for shifting one of said stops into register with the aperture in said abutment to permit movement of the segment by said key until the abutment engages the other stop.

9. In a typewriting machine, the combination of a slidable "Cap. shift" stop, a stationary "Fig. shift" stop, a type-bar segment shiftable to change case, an abutment shiftable with the segment adapted to engage said stops and having an aperture therein, a pair of shift keys operatively connected to shift the segment, and means operable by one only of said keys for sliding the "Cap. shift" stop into register with the aperture in the abutment.

10. In a typewriting machine, the combination of a "Cap. shift" stop, a carrier for said stop slidably supported to move transversely of the machine, a stationary "Fig. shift" stop, a type-bar segment shiftable to change case, a pair of shift-key levers operatively connected to shift the segment, a spring normally urging the stop-carrier in one direction, a cam connection between one only of the shift-key levers and the stop-carrier for shifting the stop-carrier in opposition to said spring, and an abutment movable with the segment having an aperture therein with which the "Cap. shift" stop is in register in one position of the stop-carrier.

11. In a typewriting machine, the combination of a "Cap. shift" stop, a carrier for said stop slidably supported to move transversely of the machine, a stationary "Fig. shift" stop, a type-bar segment shiftable to change case, a pair of shift-key levers operatively connected to shift the segment, a spring normally urging the stop-carrier in one direction, an abutment movable with the segment adapted to engage said stops and provided with an aperture, and a connection between one of said shift-key levers and the stop-carrier for sliding the carrier transversely of the machine against the action of said spring to shift the "Cap. shift" stop into register with the aperture in said abutment.

12. In a typewriting machine, the combination of a support shiftable to change case, a pair of "Cap. shift" key-levers located at opposite sides of the machine, a pair of "Fig. shift" key-levers located at opposite sides of the machine, means operable independently by said key-levers for shifting the support, a slidably supported stop carrier, a "Cap. shift" stop mounted on said carrier, and independent cam connections between the "Fig. shift" key levers and said stop carrier for shifting the "Cap. shift" stop to an ineffective position.

13. In a typewriting machine, the combination of a support shiftable to change case, a pair of "Cap. shift" key levers located at opposite sides of the machine, a pair of "Fig. shift" key levers located at opposite sides of the machine, means operable independently by said key levers for shifting the support, an abutment on the support having an aperture therein, a "Cap. shift" stop adapted to be engaged by said abutment, a slidably supported carrier for said stop, and connections between the "Fig. shift" key levers and said stop carrier for shifting the stop thereon into register with the aperture in said abutment when either "Fig. shift" key lever is actuated.

14. In a typewriting machine, the combination of a support shiftable to change case, a pair of "Cap. shift" key levers located at opposite sides of the machine, a pair of "Fig. shift" key levers located at opposite sides of the machine, means operable independently by said key levers for shifting the support, an abutment on the support having an aperture therein, a "Cap. shift" stop adapted to be engaged by said abutment, a slidably supported carrier for said stop, a spring connected with the stop carrier for sliding the carrier in one direction, and independent cam connections between the "Fig. shift" key levers and the stop carrier for shifting the stop into register with the aperture in said abutment during the initial portion of the downward movement of the key-carrying end of either of said levers.

15. In a typewriting machine, the combination of a resilient metallic support shiftable to vary the relation between impression means and a platen, resilient members located at opposite faces of said support, and antifriction rolling elements located at opposite faces of the support between the support and said members.

16. In a typewriting machine, the combination of a frame, a resilient sheet metal plate, a type-bar segment held to the plate, a plurality of antifriction rolling elements located at opposite faces of said plate, cooperating means on the plate and frame forming raceways for said rolling elements, and key-operated means for shifting the plate edgewise to change case.

17. In a typewriting machine, the combination of a frame, a resilient sheet metal plate, a type-bar segment held to the plate, key-operated means for shifting the plate edgewise to change case, resilient members held to the frame at opposite faces of the plate, means on the plate and said members forming raceways at opposite faces of the plate, and rolling elements in the raceways.

18. In a typewriting machine, the combination of a frame, a resilient sheet metal plate, a type-bar segment held to the plate, key-operated means for shifting the plate edgewise to change case, resilient members held to the frame at opposite faces of the plate, means on the plate and said members forming raceways at opposite faces of the plate, means for adjusting the members at one face of the plate toward and from the plate, and rolling elements in the raceways.

19. In a typewriting machine, the combination of a frame, a resilient sheet metal plate, a type-bar segment held to the plate, key-operated means for shifting the plate edgewise to change case, resilient members held to the frame at opposite ends of the plate, means on the plate and said members forming a pair of vertically spaced raceways at each end of one face of the plate and a raceway at each end of the other face of the plate located intermediate the vertically spaced raceways, and rolling elements in said raceways.

20. In a typewriting machine, the combination of a support shiftable edgewise to change case, resilient members located at opposite faces of the support, means on the support and said members forming raceways at opposite faces of the support, and rolling elements in the raceways.

21. In a typewriting machine, the combination of a support shiftable edgewise to change case, resilient members located at opposite faces of the support, means on the support and said members forming raceways at opposite faces of the support, means for adjusting the members at one face of the support toward and from the support, and rolling elements in the raceways.

22. In a typewriting machine, the combination of a support shiftable to change case, independently yieldable members located at opposite faces of the support, means on the support and members forming raceways, and rolling elements in said raceways.

23. In a typewriting machine, the combination of a support shiftable to change case, means on the support forming two longitudinally spaced ball channels adjacent each end of the support at one face of the support, means on the support forming a single ball channel adjacent each end of the opposite face of the support intermediate the opposed longitudinally spaced ball channels, individually yieldable members provided with ball channels cooperating with the ball channels on the support to form six raceways, and balls in said raceways.

24. In a typewriting machine, the combination of a support shiftable to change case, means on the support forming two longitudinally spaced ball channels adjacent each end of the support at one face of the support, means on the support forming a single ball channel adjacent each end of the opposite face of the support intermediate the opposed longitudinally spaced ball channels, individually yieldable members provided with ball channels cooperating with the ball channels on the support to form six raceways, means for independently adjusting the members carrying the ball channels located at one face of the plate, and balls in the raceways.

25. In a typewriting machine, the combination of a sheet metal segment carrier provided with independently flexible portions each of which is provided with a ball channel, means provided with ball channels cooperating with the channels on the flexible portions of the carrier to form raceways, balls in the raceways, and means for shifting the carrier to change case.

26. A type segment carrier for typewriting machines in which the type bars are shiftable to change case, comprising a body portion and independently yieldable portions, said yieldable portions being each provided with a ball channel.

27. A type segment support comprising a body portion and three resilient portions held to the body portion at each end of said body portion, means on the intermediate resilient portions forming ball channels facing in one direction, and means on the remaining resilient portions forming ball channels facing in a direction opposite to the channels on the intermediate portions.

28. A type segment support comprising a sheet metal plate slotted inwardly from opposite edges to form three resilient tongues at each end of the plate, each of said tongues being provided with a ball channel.

29. In a typewriting machine, the combination of a frame, a sheet metal type-segment-supporting plate provided with three independently flexible resilient tongues at each end thereof each of which is provided with a ball channel, the channels on the intermediate tongues facing opposite to the channels on the other tongues, means held to the frame provided with ball channels cooperating with the channels on the tongues to form raceways, balls in the raceways, and means for shifting the plate edgewise to change case.

30. In a typewriting machine, the combination of a frame, a sheet metal type-segment-supporting plate provided with three independently flexible resilient tongues at each end thereof each of which is provided with a ball channel, the channels on the intermediate tongues facing oppositely to the channels on the other tongues, independently yieldable members held to the frame provided with ball channels cooperating with the channels on the tongues to form raceways, balls in the raceways, and means for shifting the plate edgewise to change case.

31. In a typewriting machine, the combination of a frame, a sheet metal type-segment-supporting plate provided with three independently flexible resilient tongues at each end thereof each of which is provided with a ball channel, the channels on the intermediate tongues facing oppositely to the channels on the other tongues, independently yieldable members held to the frame provided with ball channels cooperating with the channels on the tongues to form raceways, means for adjusting the two members cooperating with the intermediate tongues toward and from said tongues, balls in the raceways, and means for shifting the plate edgewise to change case.

32. In a typewriting machine, the combination of a frame, a support shiftable to change case, means on the frame and support forming three longitudinally spaced raceways adjacent both side edges of the support, the two intermediate raceways being opposed to the remaining raceways, rolling elements in the raceways, and means for causing the raceway forming means to engage the rolling elements under spring pressure.

33. In a typewriting machine, the combination of a frame, a support shiftable to change case, means on the frame and support forming three independent longitudinally spaced raceways adjacent both side edges of the support, the two intermediate raceways being opposed to the remaining raceways, rolling elements in the raceways, and means for causing the raceway forming means to engage the rolling elements under spring pressure, the means forming each individual raceway embodying two opposed yieldably supported members.

34. In a typewriting machine, the combination of a frame, a support shiftable in the frame to vary the relation between printing means and a platen, a rod extending transversely of the frame, a three-arm lever having two slotted arms pivotally supported on the rod adjacent opposite sides of the frame and an arm connected with the support, a pair of "Fig. shift" key levers fulcrumed in the frame adjacent opposite sides of the frame each having an upstanding portion adjacent said rod extending through the slot in the adjacent arm of said three-arm lever, a pair of "Cap. shift" key levers fulcrumed in the frame adjacent the "Fig. shift" key levers, means connecting each shift key lever with the three-arm lever for rocking the same about the rod to shift the support, a "Cap. shift" stop adapted to arrest the support, a transversely slidable carrier for said stop having two cam portions located in the path of movement of the upstanding portions of the "Fig. shift" key levers for shifting the stop to an ineffective position, and a return spring for the stop carrier.

35. In a typewriting machine, the combination of a main frame, a vertically shiftable type-bar segment support, a bracket held to the frame having vertically spaced forwardly extending shelf-like portions, a stop mounted on each forwardly extending portion of the bracket for determining the uppermost and lowermost positions of the support, a rod extending transversely of the frame, a stop-carrier slidably supported at its forward end on said rod and at its rear end on the lower shelf-like portion of the bracket, a stop mounted on the rear end of said carrier adapted to arrest the support in an intermediate position, a pair of shift key levers connected with the support to shift the support, means forming a cam connection between one of said key levers and the stop carrier for sliding the carrier laterally to render the stop thereon ineffective, and a spring connected with the stop-carrier normally holding the stop on the carrier in support-arresting position.

36. In a typewriting machine, the combination of a frame, an upstanding type-bar segment carrier extending transversely of the frame provided with two vertically spaced rearwardly facing ball channels adjacent each end thereof and two forwardly facing ball channels adjacent opposite ends thereof intermediate the rearwardly facing channels, a pair of brackets mounted in the frame adjacent the ends of the carrier and each having two forwardly facing ball channels therein cooperating with the adjacent rearwardly facing ball channels on the carrier to form raceways, a pair of plate-like members loosely interlocked with said brackets and each having a rearwardly facing ball channel cooperating with one of the forwardly facing channels on the carrier to form a raceway, balls in the raceways, means for adjusting the plate-like members fore and aft of the machine, and means for shifting the carrier.

37. In a typewriting machine, the combination of a frame, an upstanding type-bar segment carrier extending transversely of the frame provided with two vertically spaced rearwardly facing ball channels adjacent each end thereof and two forwardly facing ball channels adjacent opposite ends thereof intermediate the rearwardly facing channels, a pair of brackets mounted in the frame adjacent the ends of the carrier and each having two forwardly facing ball channels therein cooperating with the adjacent rearwardly facing ball channels on the carrier to form raceways, a pair of plate-like members loosely interlocked with said brackets and each having a rearwardly facing ball channel cooperating with one of the forwardly facing channels on the carrier to form a raceway, balls in the raceways, said members being resilient, and means for adjusting the plate-like members fore and aft of the machine and holding the same under tension in adjusted position.

In testimony whereof I hereunto affix my signature.

FRANK H. ARMSTRONG.